United States Patent [19]

Frodelius

[11] Patent Number: 4,664,261
[45] Date of Patent: May 12, 1987

[54] STORAGE MEANS FOR TAPE OR DISC RECORDING MEDIA

[76] Inventor: Jan-Erik Frodelius, Eggvena, 524 00 Herrljunga, Sweden

[21] Appl. No.: 863,379
[22] PCT Filed: Sep. 23, 1985
[86] PCT No.: PCT/SE85/00364
§ 371 Date: May 1, 1986
§ 102(e) Date: May 1, 1986
[87] PCT Pub. No.: WO86/01930
PCT Pub. Date: Mar. 27, 1986

[30] Foreign Application Priority Data

Sep. 21, 1984 [SE] Sweden .................. 8404736

[51] Int. Cl.⁴ .......................................... B65D 85/672
[52] U.S. Cl. ..................................... 206/387; 312/319
[58] Field of Search .............. 206/387, 1.5; 312/319, 312/12, 13, 111, 345, 349

[56] References Cited

U.S. PATENT DOCUMENTS

| | | | |
|---|---|---|---|
| 3,899,229 | 8/1975 | Ackeret | 206/387 |
| 4,191,292 | 3/1980 | Schweizer | 206/387 |
| 4,275,943 | 6/1981 | Gelardi et al. | 206/387 |
| 4,293,266 | 10/1981 | St. Lawrence et al | 206/387 |
| 4,399,913 | 8/1983 | Gelardi et al. | 206/387 |
| 4,428,480 | 1/1984 | Ackeret | 206/387 |
| 4,493,417 | 1/1985 | Ackeret | 206/387 |

Primary Examiner—Joseph Man-Fu Moy
Attorney, Agent, or Firm—Balogh, Osann, Kramer, Dvorak, Genova & Traub

[57] ABSTRACT

A storage system for recording media such as cassettes for audio or video equipment or compact discs in its own original protective box which consists of lid and drawer elements capable of moving relative to each other. The boxes are stored in a holding space in a storage rack. The box can be introduced into or removed from the space for the storage and the insertion or removal of the medium in a closed 'storage position' (I) or in an open 'access position' (II). A holder to retain a protective box in the desired positions in the rack consists of connecting structure to retain the box in position relative to the holder. The holder interacts with the storage rack to prevent the holder and the protective box from being moved past the desired 'access position' (II), and as to prevent unauthorized movement from the 'storage position' of the holder.

20 Claims, 24 Drawing Figures

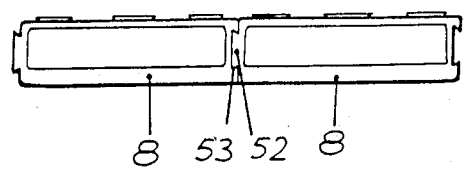
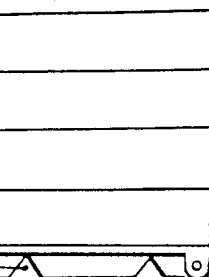
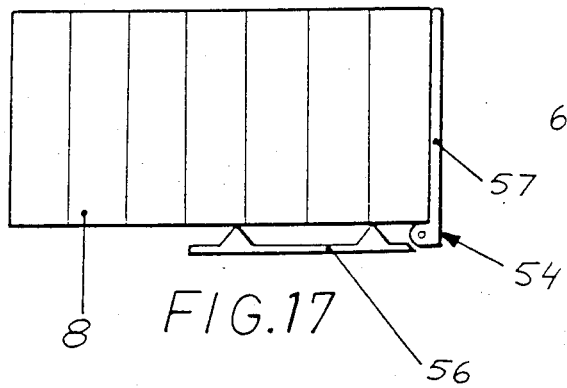
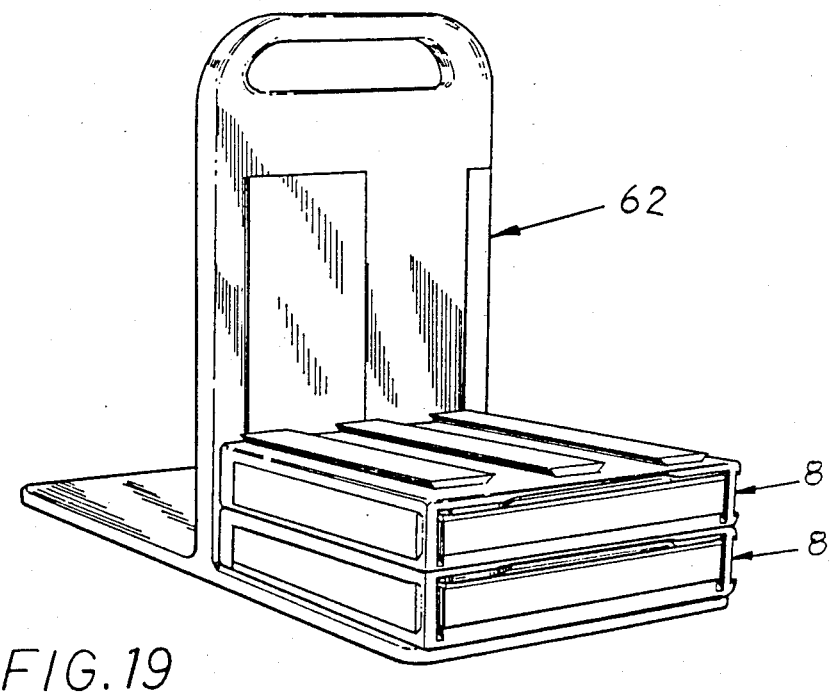

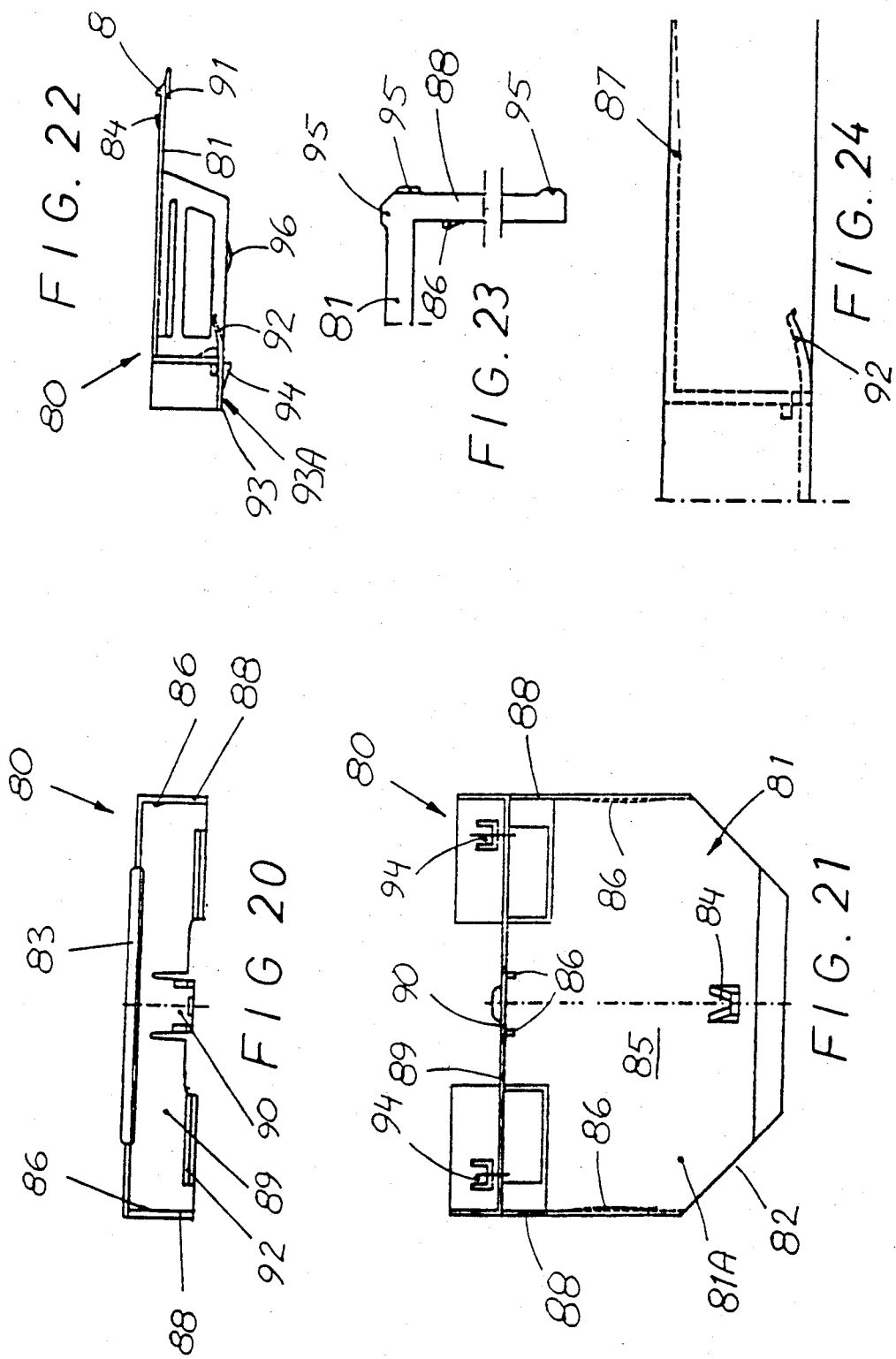

STORAGE MEANS FOR TAPE OR DISC RECORDING MEDIA

The present invention relates to a storage means for tape or disc recording media such as cassettes for audio or video equipment or compact discs of the CD/laser type, for example, each of which is so arranged as to be held in its own original protective box or a similar case which consists of lid and drawer elements capable of moving relative to each other, said boxes being so arranged as to be stored in a suitable holding space in a suitable storage rack or a similar storage box, said box either with or containing the recording medium in question being capable of being sliding into or from said space for the purpose of permitting the storage and the insertion or removal of a medium of the type in question in a closed "storage position" or in a open "access position".

Previously disclosed storage means, for example for tape cassettes, consist of racks which exhibit a number of holding openings for the individiual cassettes, which are enclosed in an openable original protective box. When it is wished to use the the cassette, however, it is first necessary to withdraw the cassette box fully from the opening in question in order to be able to open the box and then remove the cassette. Then, after having closed the box, it must be pushed back into the rack. The procedure is repeated when it is wished to replace a cassette in an empty box. Said means is not suitable for motor vehicles, for instance, because of the complicated nature of its operation, since the wish frequently exists to be able to operate cassettes with one hand when removing them from and replacing them in the appropriate rack.

A storage means known from the EP, A2, 0 004 523 makes holding of cassettes in their original protective boxes possible. But this known means where cassettes and boxes have to be swung out from the belonging rack around a rotation axis before the opening of said box, result in a complicated nature of the operation of the cassettes and which means safely not hold the protective boxes in question in vehicles and other varying places.

A large number of other means exists which require the cassette to be removed from its original box prior to being stored in a rack, which means that expensive original boxes are not used for the storage of cassettes in racks, and that the cassettes are not protected as effectively against external influences in said previously disclosed racks, for example against the effect of dust and other impurities. Furthermore, the index on the box cannot be used when cassettes are transferred to some other storage means, and the box must be kept in what is not always an easily accessible place for future use.

The principal object of the present invention is thus primarily to make available a means for solving the problems mentioned above by enabling cassettes, etc., to be held in their original box when stored in a rack, from which the box cannot be removed unintentionally when withdrawing or inserting a cassette, etc., but which is easily operated and is suitable for application in a number of different areas.

Said object is achieved by a means in accordance with the present invention, which is characterized essentially in that a holder, which comprises a plate or some other similar part of the holder, extending along said box element from a number of clamping elements, which are located at the inner of the holder and which can co-operate with said box element, is intended to be used to retain a protective box of the type in question in said desired positions in said rack, and in that the holder also includes means capable of interacting with the storage rack so arranged as to prevent the holder and the protective box in question from being moved past said desired "access position" and unauthorized movement from the "storage position" of the holder.

The invention is described below in relation to a number of preferred embodiments and with reference to the drawings, of which:

FIG. 16 shows a view of a laterally assembled rack;

FIG. 17 shows a foot attached to a number of racks connected together in a row;

FIG. 18 shows a foot with racks connected together vertically;

FIG. 19 shows a carrying device for connectable racks,

FIGS. 20–24 show a variant of a holder, which is included in an additionally means, FIG. 20 shows the holder from the front, FIG. 21 shows the holder from the top, FIG. 22 shows the holder from the side, FIG. 23 shows a corner portion of the holder, and FIG. 24 shows a inner portion of the holder.

Figure 1:
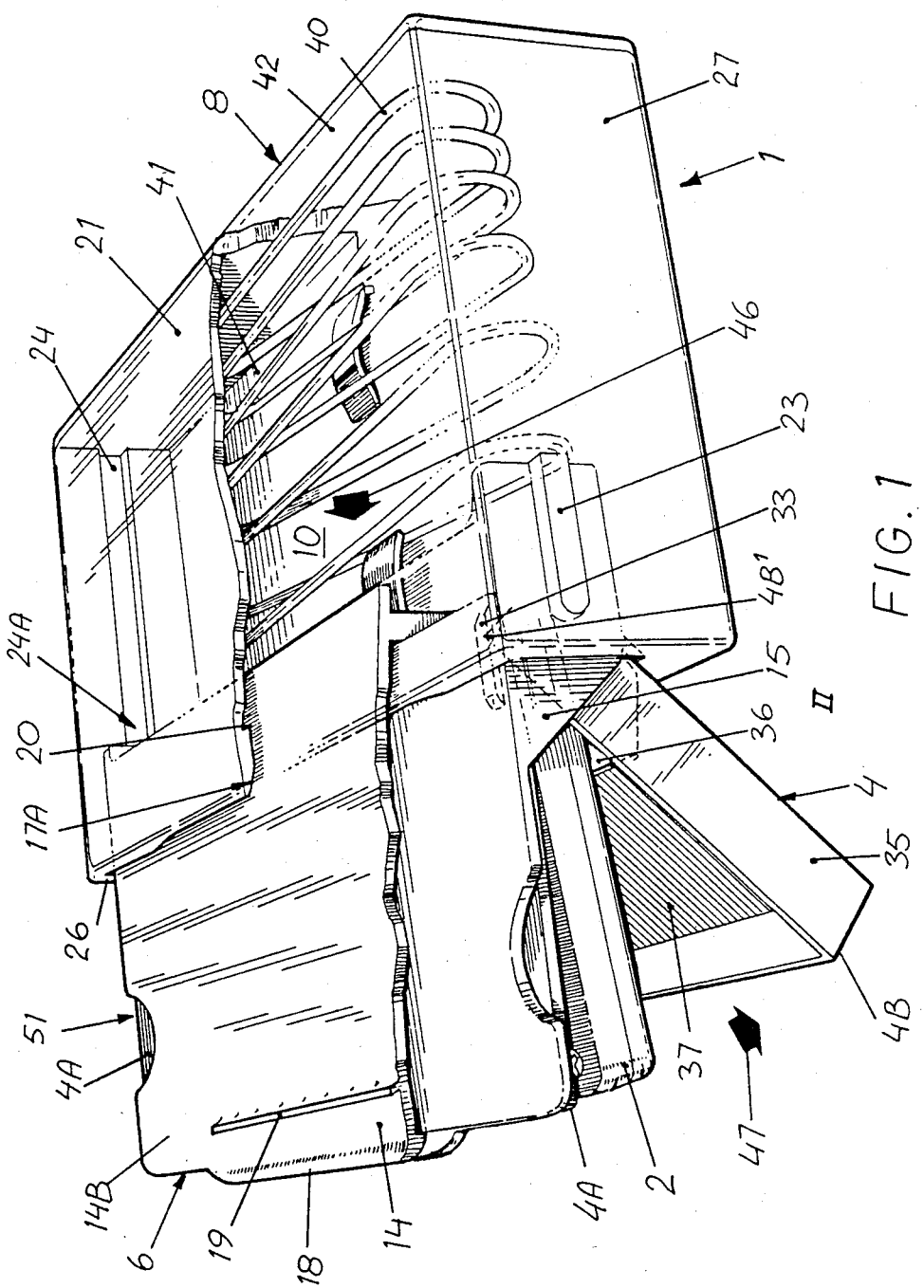
FIG. 1 shows a perspective view of the means in partially sectioned form with a box moved into its so-called "access position"
Figure 2:
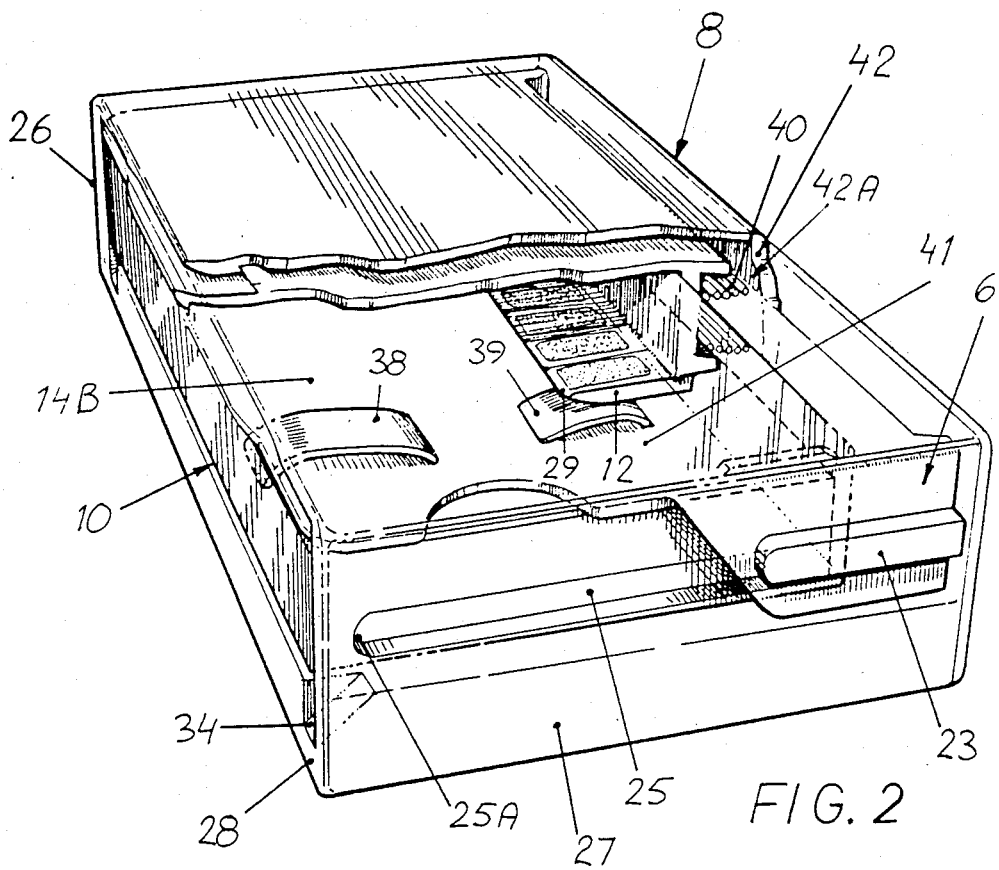
FIG. 2 shows the means in a so-called "storage position"
Figure 3:
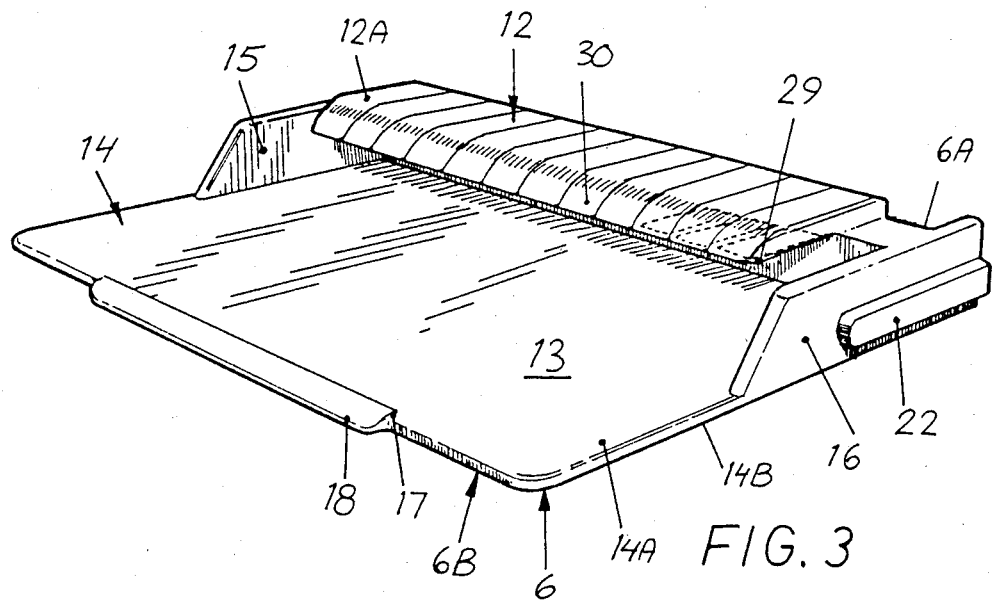
FIG. 3 shows a holder contained in the means.
Figure 4:
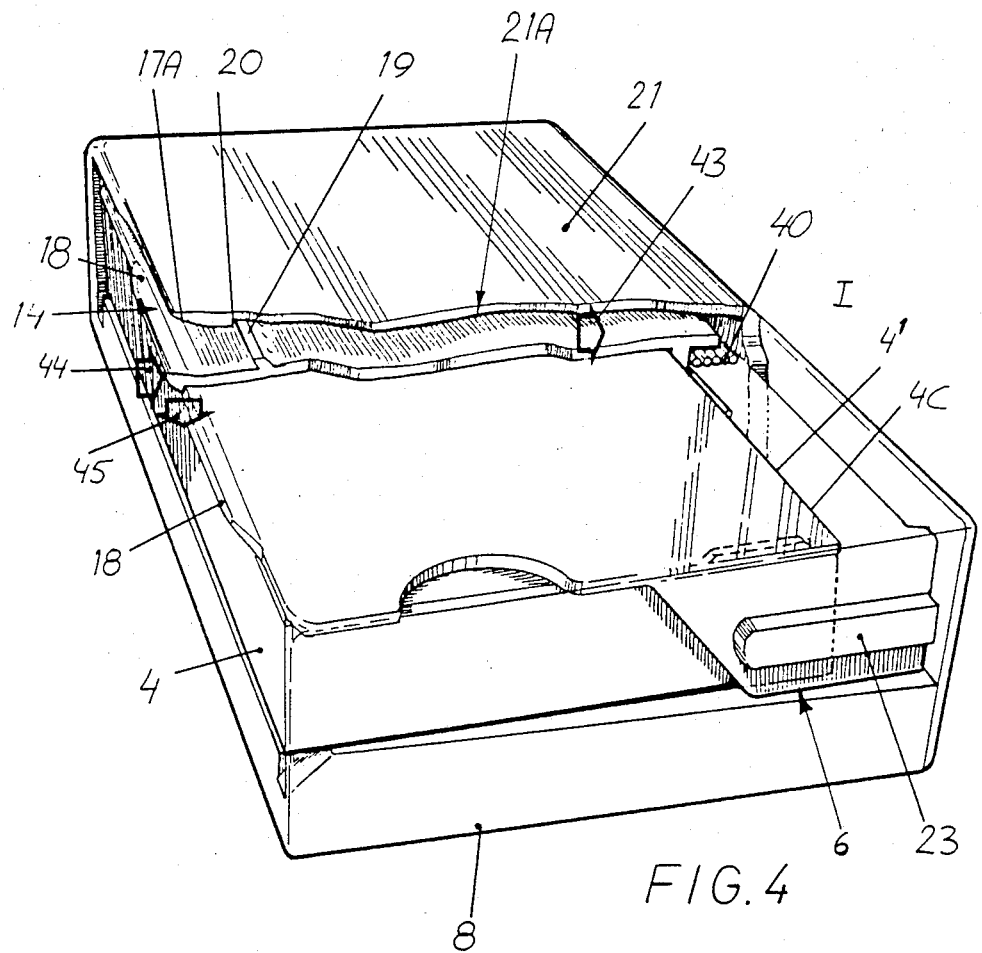
FIG. 4 shows a partially sectioned view of the means.
Figure 8:
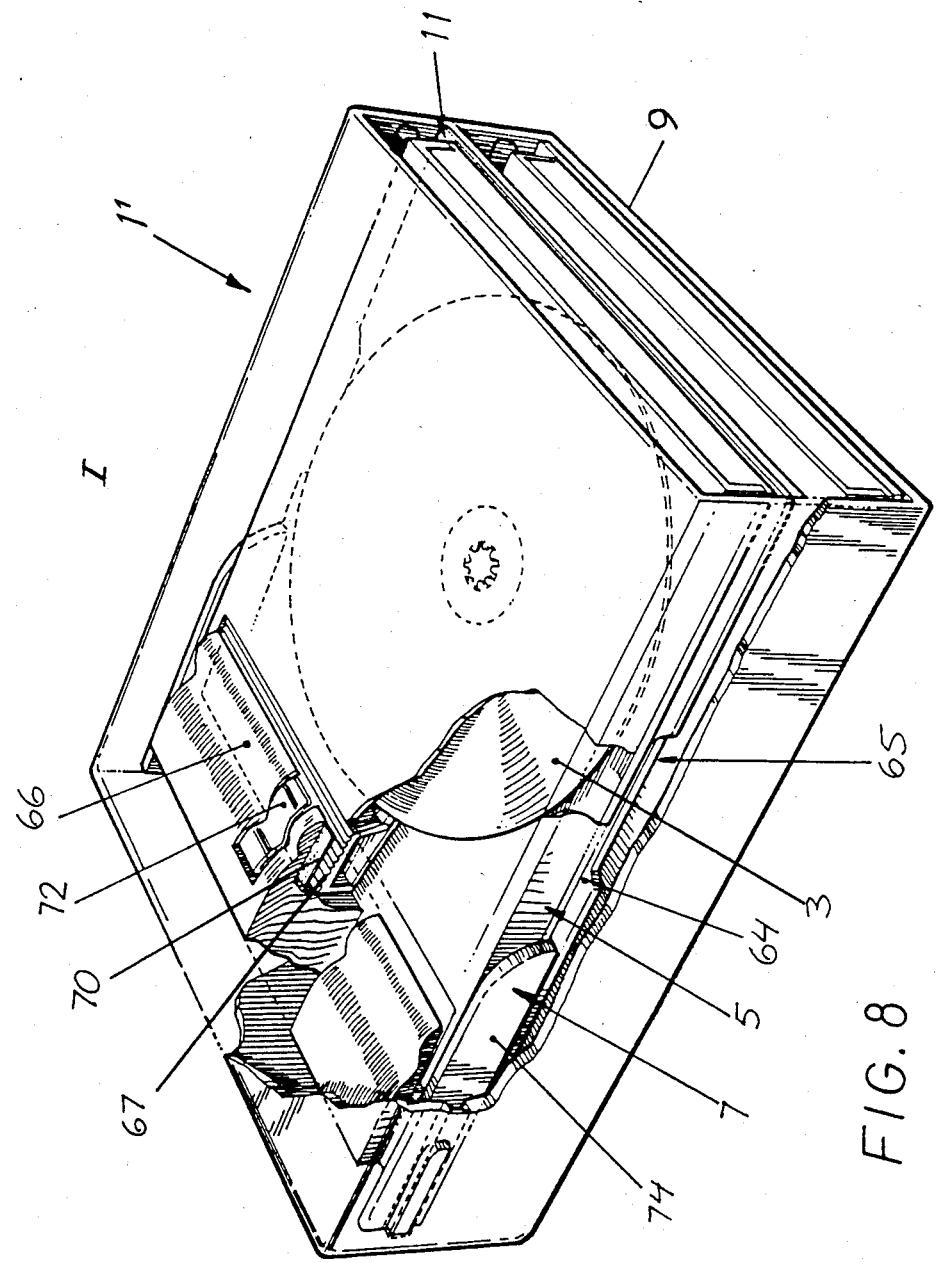
FIG. 8 shows a variant of a means designed to hold disc recording media.
Figure 9:
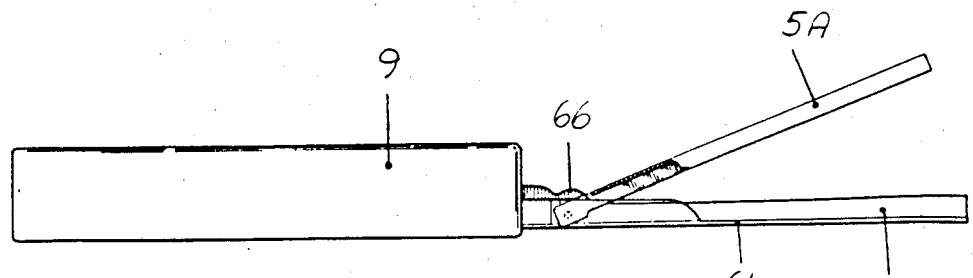
FIG. 9 shows a side view of the means with a partially opened lid element shown in FIG. 8.
Figure 10:
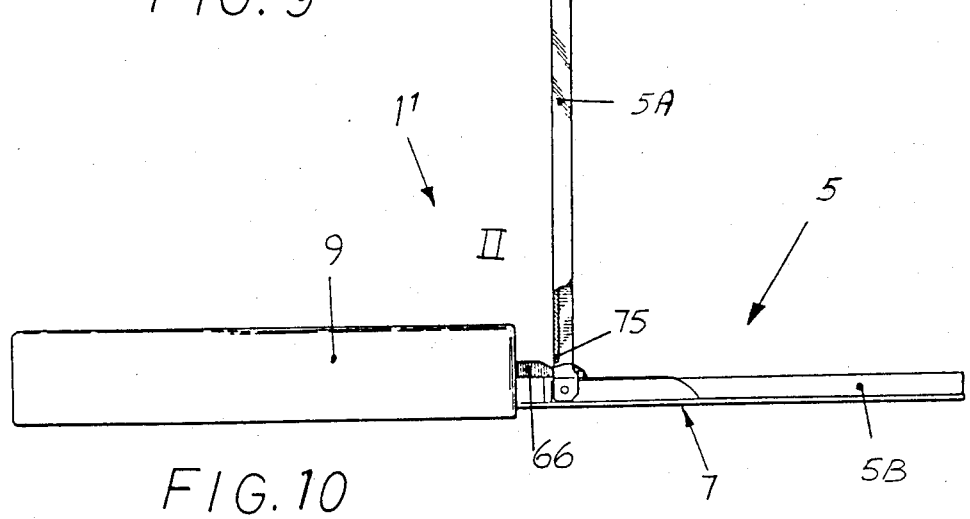
FIG. 10 shows the lid element in the fully open position.
Figure 11:
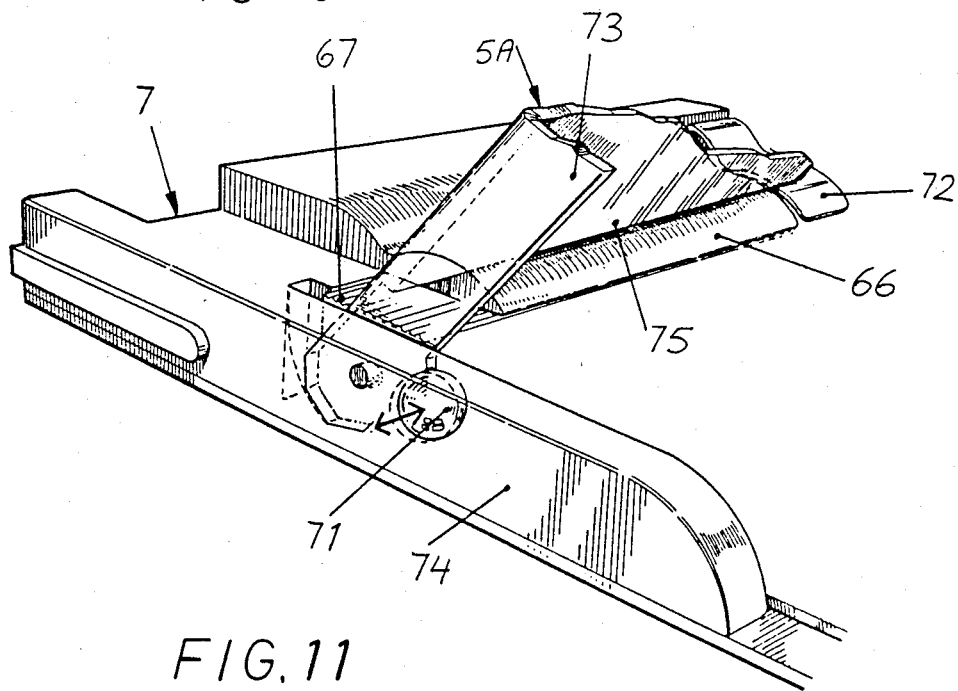
FIG. 11 shows means which enable the lid to be moved into the open position.

In accordance with the present invention a storage means 1 and $1^1$ is suitable for the storage of tape of disc recording media such as cassettes 2 for audio or video equipment or compact discs 3 of the CD/laser type, for example, each of which is so arranged as to be held in its own original protective box 4 and 5 or a similar case which consists of lid elements 4A and 5A and drawer elements 4B and 5B capable of moving relative to each other, of a holder 6 and 7, and of storage rack 8 and 9 or a similar storage box. The medium 2 and 3 in question is so arranged together with an associated protective box 4, 5 as to be stored in a suitable space 10 and 11 in a storage rack 8, 9, to and from which space 10, 11 the box 4, 5 either with or containing the recording medium 2, 3 in question can be moved for the purpose of permitting the storage of the medium 2, 3 in a closed so-called "storage position" I, as shown in FIGS. 2, 4 and 8, and the insertion or removal of a medium 2, 3 in an open so-called "access position" II, as shown in FIGS. 1 and 10.

Said holder, 6, 7 is intended to be used to retain a protective box 4, 5 in its desired positions I, II in the storage rack 8, 9 and to prevent the box 4, 5 together with its contents from being removed from the rack 8, 9 at an undesired time past said desired "access position" II or from the "storage position" I of the holder.

The means 1 shown in FIGS. 1–5, which is intended for the storage of tape media 2, exhibits a number of connecting means 12 on each holder 6 so arranged as to hold the box 4 in position relative to the holder 6, said means 12 preferably being in the form of a number of sprung clamping elements extending along a section of a part of the box 4A, preferably being a number of finger-like clamping elements 12A which may be arranged in rows and which may be connected to each other laterally. The clamping elements 12A in question extend preferably in a direction away from the inner end 6A of the holder towards the outer end 6B of the holder. The function of said elements is, for example by means of a clamping effect after having received a box 4 in position at the box holding point 13 of the holder inside a preferably transparent plate 14 forming part of the holder 6 or extending as some other, additional part of the holder in a direction outwards from the holding space 10 and in a direction away from the clamping elements 12A of the holder, to hold the box 4 together with any contents in position at the storage point 8, with said plate 14, etc., extending in close contact along one part 4A of the box and thus in a direction away from the inner end $4^1$ of the box and from the side of same enclosing a section 4C of the edge of the box 4. Side walls 15, 16 on the holder 6 restrict the sideways movement of the box.

The means 1 is particularly suitable to hold protective boxes 4 of the kind which consist of a drawer-shaped holding element 4B with a lid element 4A capable of hinging relative to it, with the one element 4A containing a perforated edge section 4C extending past the holding space in the box intended for a recording medium 2 of the kind in question.

A number of locking elements 17, preferably in the form of a strip, can be arranged on said plate 14 on its side 14A facing the inner space 13 of the holder, and which are so arranged as to interact from one side of one part of the box with, for example, the lid 4A in order to ensure said holding of a box 4 in position in the holder 6. Said elements 17 are best formed from a section of an actuating handle 18 or similar by means of which the holder 6 is also easily operated. The rack 8 can exhibit an inclined section 17A intended to interact with components 19 situated on the upper side 14B of the holder plate when the box is introduced into position in the rack 8.

The securing of a holder 6 in its inserted "storage position" I in a rack 8 can be achieved by means of a number of locking means 19, preferably in the form of a strip or some other type of locking projection so arranged as to interact with a suitable locking element 20, preferably a locking recess suitable to accommodate said locking means 19 in the "storage position". The example shown relates to a strip 19 attached to the upper side 14B of the holder plate by means of a suitable strip accommodating recess 20 situated on the inside 21A of the roof 21 of the rack 8, although the locking means 19 and the locking element 20 can, of course, be arranged at other points on the holder 6 or the rack 8. At least said locking means 19 and also the handle 18 can constitute components of the kind in question which interact with the inclined part 17A of the rack during said introduction of the box 4 into the rack 8.

The holder 6 also comprises a number of control means 22 and 23 which are capable of interacting with suitable interacting control elements 24 and 25 situated on the inside of the rack 8 at its side pieces 26 and 27, in which case the control means 22, 23 can consist of projections 22, 23 in the form of strips projecting laterally from the side walls 15, 16 of the holder, said projections being capable of being accommodated in suitable guide elements in the form of guide grooves 24, 25 extending in the direction of movement of the holder. Said guide grooves 24, 25 should preferably not extend fully from the inner holding space 10 of the rack, yet without an interruption being formed in the groove 24, 25 in the area of the front 28 of the rack. The outer ends 24A and 25A of the respective guide grooves 24, 25 thus constitute a stop means for the holder 6, the purpose of which is to prevent the holder from being moved past its "access position" II. The control means 22, 23 should preferably be so arranged that the majority of them are situated in an area bounded by the inner end 6A of the holder and by a section of the edge 4C of a box 4 enclosed in the holder.

In order to facilitate the introduction of a box 4 into its "storage position" I in the holder 6, the outer end of each clamping element 12A exhibits a chamfered section 29, and/or in order to facilitate the withdrawal of the holder from its "storage position" I in the rack 8, the clamping elements 12A may be provided with a suitable chamfered section 30 to prevent the holder 6 from becoming caught on parts situated inside the rack 8.

Figure 5:
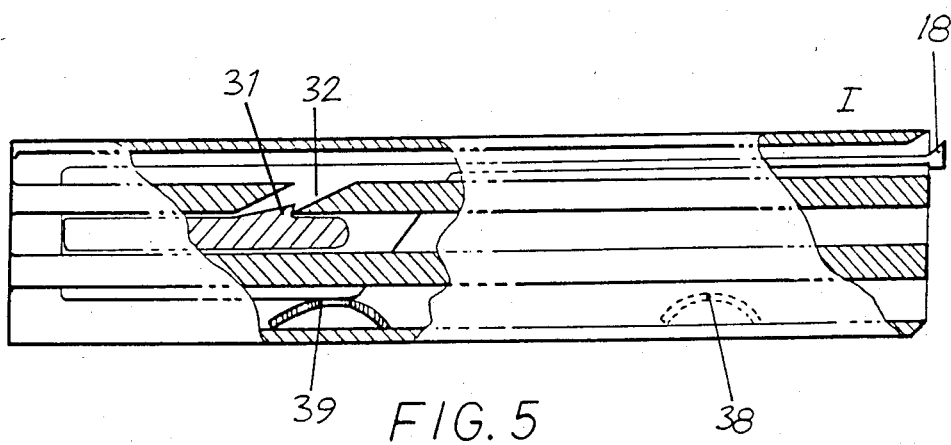
FIG. 5 shows a side view of a further variant of a means.

Said control means 22, 23 and the control elements 24–25 may, as shown in FIG. 5, also be provided with stop heels 31 and stop recesses 32 which can be used as a locking mechanism in combination with each other when the box is in its "storage position" I.

The holder 6 may well incorporate recesses 33 in its inner part in order to permit the accommodation of the part $4B^1$ of the drawer-shaped part 4B of the box which extends upwards, rearwards and to the sides when the box 4 is opened. Similar recesses 34 are arranged on the front 28 of the holder for the purpose of accommodating shank-like side walls 35 situated to either side of a recess 36 in the bottom 37 of the part of the box, in the drawer part 4B of the box, when it is opened, when the holder 6 is in its "access position" II.

The storage rack 8 may comprise a number of spring means 38, 39 and 40, for example leaf springs 38, 39 and 40, having a variety of functions. A front leaf spring 38 positioned on the bottom part 41 of the rack serves the function of forcing the box 4 and the holder 6 towards the locking element 20 and of counteracting the mass of the holder 6 and the box 4 with its contents, as well as facilitating the closing and sealing of the box 4. Rear leaf springs 39 positioned in the area situated beneath the clamping elements 12A when the holder 6 has been introduced into its "storage position" are so arranged as to press against the clamping elements 12B on the holder 6 and to ensure the function of the locking mechanism even when the holder 6 is empty, for example during the shaking of a motor vehicle, etc. Helical springs 40, for example of the pressure type, are so arranged as to be controlled by a suitable means, for example by tracks in the inner space 10 of the rack, for example in the top and bottom parts of the rack 8, and as to act between, for example, the inside 42A of the rear wall 42 of the rack and the holder 6 with the box 4 and its contents 2 for the purpose of causing these to move towards the "access position" II.

Since the rack 8 exhibits a depth in the space 10 which exceeds the depth of the holder by a certain amount, it is possible for the holder 6 to be introduced in the direction of the arrow shown in FIG. 4 when the handle 8 is moved in the direction of the arrow 44, whereby the locking mechanism 31, 32 and/or 19, 20 will be released after depressing the handle 18 in the direction of the arrow 45. Keeping the handle in the depressed position will enable the holder 6 to be ejected by the effect of a spring 40 in the direction of the arrow 46 towards its "access position" II. When in said position II the part 4B of the box can be swung downwards in the direction of the arrow 47 so that, for example, the cassette 2 can be removed from the part 4A of the box or inserted into same.

The holder 6 or the rack 8 can also be fitted with a spring-actuated protective cover to offer further protection against the entry of impurities into the inside of the holder through its opening.

Figure 6:
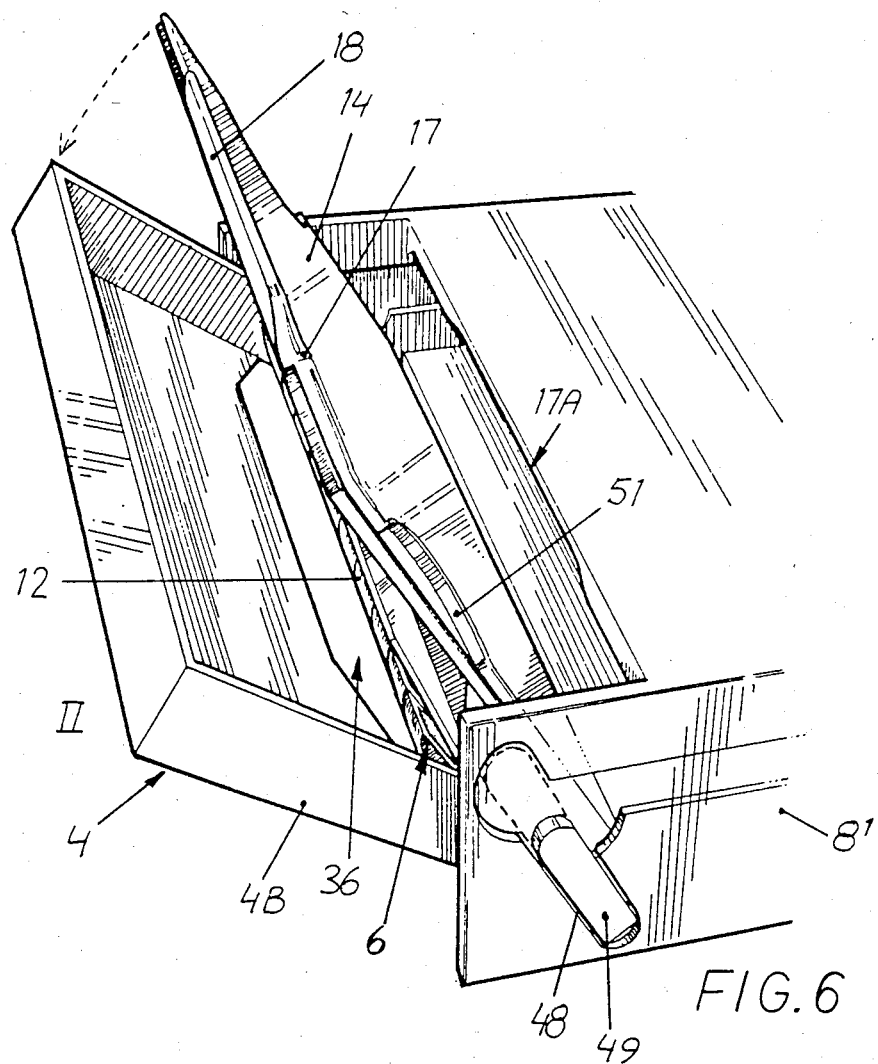
FIG. 6 shows yet another variant of a means.
Figure 7:
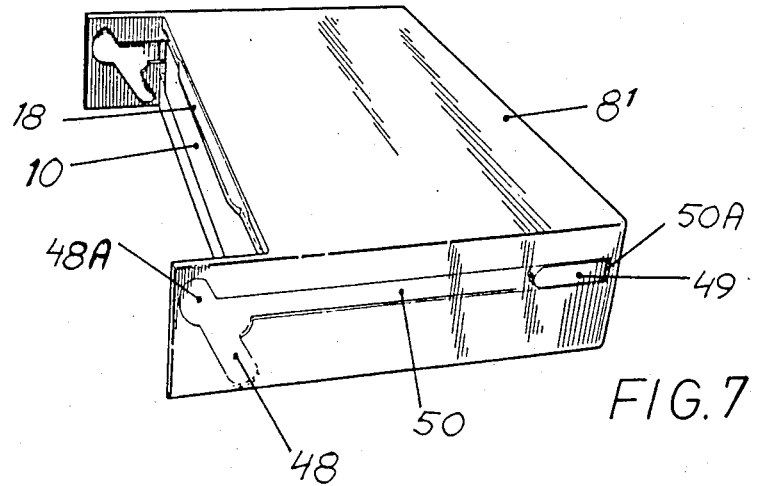
FIG. 7 shows a storage rack suitable for the means in FIG. 6.

In FIGS. 6 and 7 there is shown an embodiment of a rack 8[1] which exhibits connecting means 48 in the form of oblique grooves in which suitable guide projections 49 similar to the above-mentioned guides 22, 23 are so arranged as to be capable of turning and of being carried downwards so as to be retained in position there on opening a drawer part 4B of a box when the box 4 and the holder 6 are in the "access position" II. On closing, the box 4 and the holder 6 are raised to the upper end 48A of the guide groove 48, where they pivot in such a way that the guide groove 49 can then be displaced to the rear end 50A of the guide groove 50.

Recesses 51 to facilitate the handling of the box can be so arranged on the holder plate 14 as to permit easy access to the lid element 4A of the box when a box is inserted or withdrawn.

The racks 8, which may exhibit single or multiple recesses 10 each accommodating its own holder 6, may exhibit means permitting the optional combination of a number of racks 8 into any desired shape to suit the requirements. For instance dove-tailed connection grooves 52 and 53, as clearly shown in FIG. 14, may be so arranged as to extend along the sides of each rack 8 and may be so designed as to be introduced into and to engage with a matching groove 53, 52 at the top and/or to the side and/or to the rear.

Figure 12:
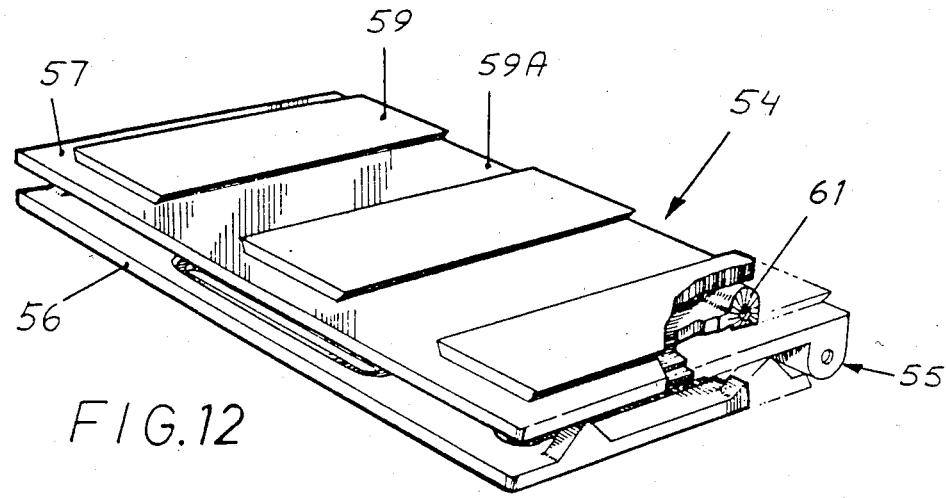
FIG. 12 shows a foot of a kind which is suitable for the attachment of the storage rack in desired positions.
Figure 13:
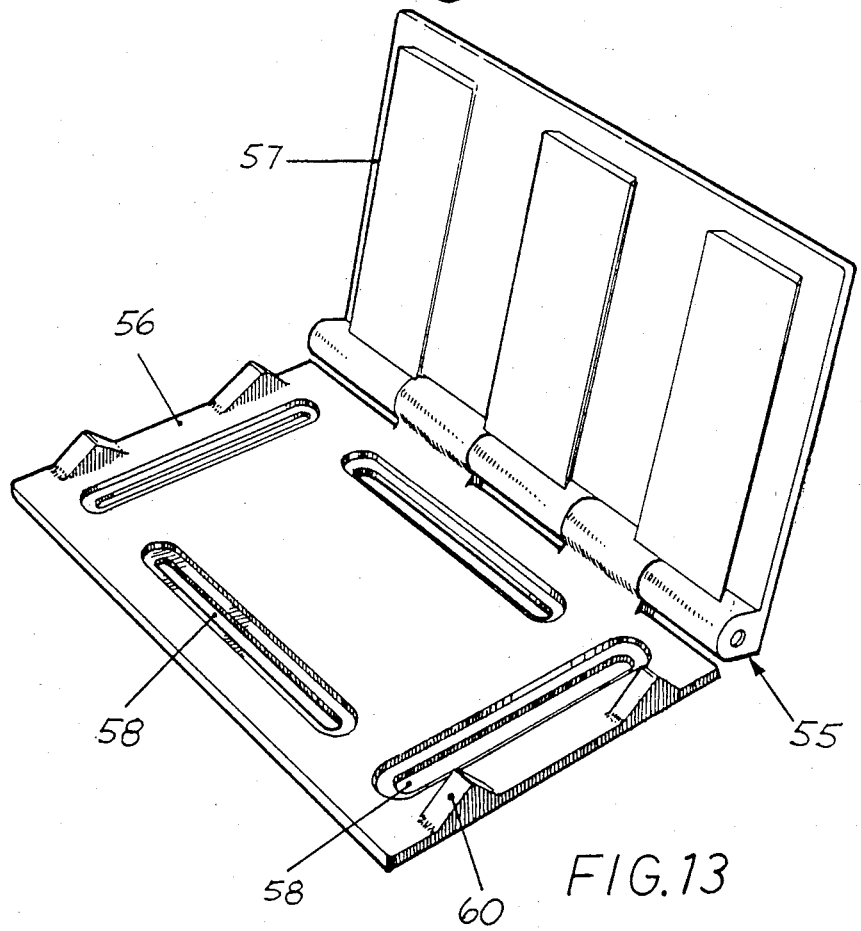
FIG. 13 shows the foot in the raised position.
Figure 14:
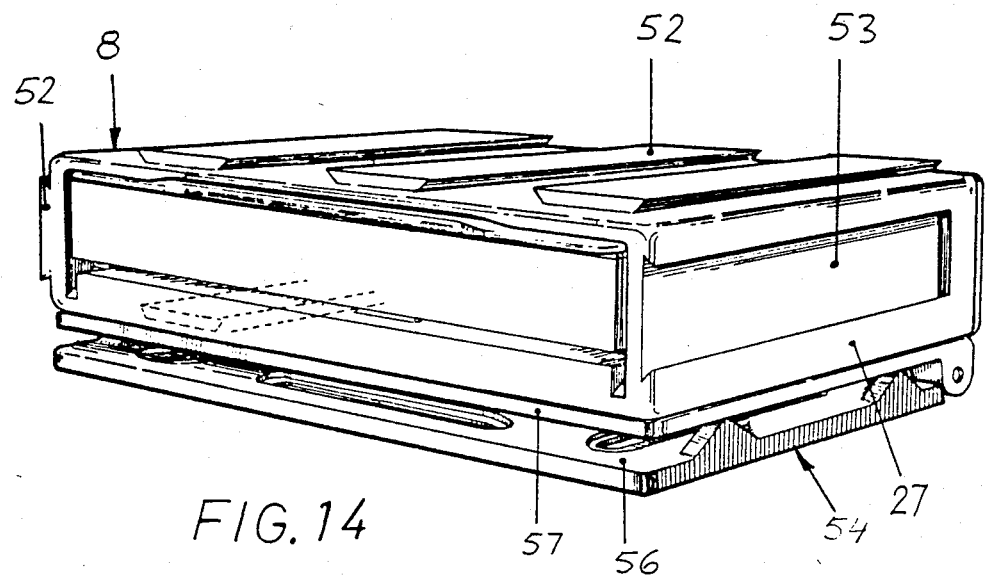
FIG. 14 shows the foot attached to a storage rack.

A connecting foot 54 which enables any rack 8 to be attached at a desired point, for example in a motor vehicle, may consist as shown in FIGS. 12-14 of two plates 56 and 57 pivotally connected relative to each other by means of an articulated link 55. Recesses 58 to accommodate fixing elements, for example screws, may be arranged on at least one of the plates 56, with at least the other plate 57 being provided with corresponding connection grooves 59 and 59A similar to the connecting grooves 52, 53 to permit the combination of a number of storage racks 8 into any desired pattern, as illustrated in FIGS. 17-18 for example. A spacer 60 can be arranged between said plates 56, 57, and the link 55 can exhibit locking means 61 to permit the angular ad3ustment and erection of the plates 56, 57 to a desired angle relative to each other.

Illustrated in FIG. 19 is an easily portable transport means 62 which is suitable for holding a number of racks 8 complete with holders 6, boxes 4 and media 2 at a desired time, for example for transport between the vehicle and the home.

Figure 15:
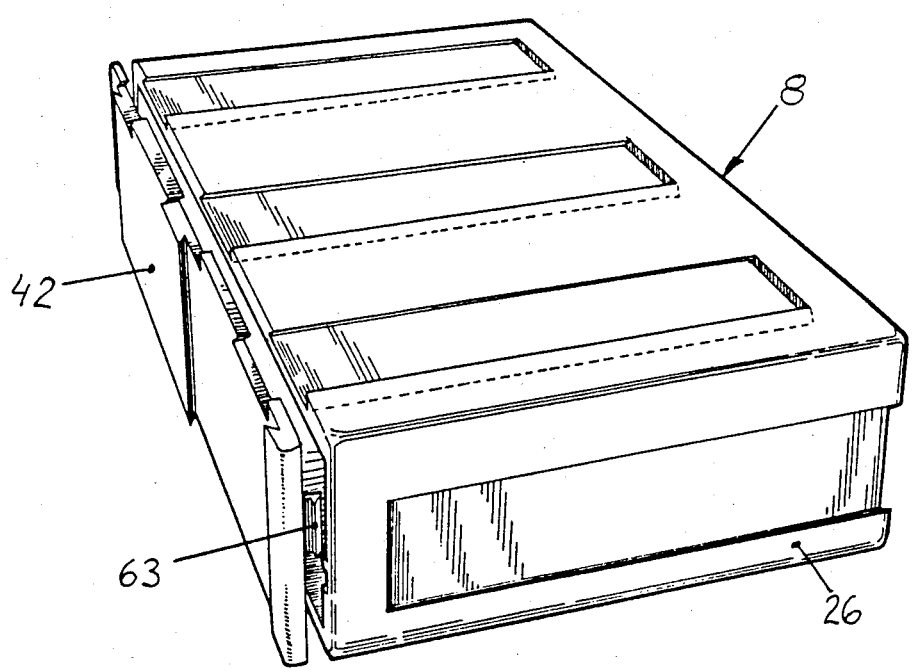
FIG. 15 shows a rack with its associated, seperately attachable backing piece.

Illustrated in FIG. 15 is the manner in which the rear wall 42 of a rack 8 is easily detachable, for instance by means of snap connectors 63 so arranged as to be introduced into suitable recesses at the sides 26, 27 of the rack 8, thereby permitting the easy manufacture of the rack 8.

Illustrated in FIGS. 8–11 is a means 1[1], suitable to receive and store disc-shaped media, and this rack may be arranged in a similar fashion to the means 1 described above with the exception of other dimensions. A holder 7, which may exhibit a base plate 64 which exhibits recesses 65 to make it easier to take hold of the disc 3, exhibits connecting organs 66 similar to the organs 12 present in the holder 6 allowing a secure grip to be taken of the inner edge port 67 of a section 5B of the bottom of a box 5 which also exhibits a hinged lid 5A. The under side of the organs 66 may well be provided with means 70 to increase the friction with the edge section 67, which may be knurled. In order to ensure that the lid element 5A is held erect with the holder 7 withdrawn together with the appropriate box 5 and disc 3, a lid erection means 71 and/or 72 may be provided on the holder 7. This may be, for example, a lock 71 capable of interacting with the side 73 of the lid 5A and capable of being extended from the side 74 of the holder or a flexible locking tongue 72 capable of interacting with the inner edge 75 of the lid 5A so arranged as to snap into engagement beneath the side 73 of the lid 5A or beneath the edge 75 of the lid when the lid 5A is fully open, thereby preventing the unintentional closing of the lid of the box.

The further variant of a holder 80 shown in FIGS. 20–24 is different from the previous described embodiment especially regarding the shaping of the back portion and by the outer shape of the same.

The holder 80 in question, which has a plate 81 with recesses 82 at the outer portion of the plate at each side of an actuating handle 83 and a holder locking means 84, has also an inner holder space 85, intended to hold a cassette or other recording media. Internal projections 86, 87 at the holder 80 are arranged to make it possible to bridge any space between a cassette box and the walls 88, 89 and other element, which being positioned at the holder 80 extending alongside the space 85.

At time back wall 89 of the holder is a tongue 90 arranged which is fixed swingable in direction against the inner holder space 85 and which is influenced by a spring which work between the tongue 90 and the back wall of a rack to strive to be pushed in against the inner holder space 85 for the purpose of first pushing one in the space hold cassette box in direction against one at the inside 81A of the holder plate 81 situated locking element 91, in a way that the box will be retained safely by the holder 80. Said spring can for example consist of a helical spring of the pressure type.

Normally a box will be clamped inside the space 85 by a number of preferably like elastic tongues formed clamping or other connecting means, positioned at the inner portion of the holder and which are arranged, as been shown in the previous variants, to clamp around an inner portion of the box, and not preventing simultaneous opening of the box during the clamping period.

At the underside 93A of a bottom portion 93 of the holder 80 a number of projections 94 are situated which can co-operate with suitable tracks at a rack, and that said projections 94 can co-operate with suitable stops at the front of the rack and which stop prevent continued out sliding of the holder out from the rack.

If for any reason a holder 80 wished to be removed this can be done after bending the projections 94 away from each other and the belonging stop.

The holder 80 is guided in the belonging holding spaces by projecting guiding strips 95 situated on the side walls 88 of the holder, and which are arranged to co-operate with the preferably smooth inner sides of the rack, which suround the holder 80.

At the bottom of the holder 80, preferably at the side walls 88, downwardly outgoing projections 96 can be situated and which strives to lift up the outer portion of the holder when the holder 80 is hold in the rack.

Simulary springs as the springs 38, 39 in the previous example can be arranged at the bottom of the holder when it is hold in the rack, preferably a number of resilient tongues can be arranged punched from the rack and aimed to work against the bottom side of a box hold in the holder 80 in order to additionally ensure the secure holding effect of the means, when holder with box and possibly contents are held in so-called "storage position", slided in from so-called "access position".

A holder according to the one mentioned above is pulled out by gripping the handle 83 and push it down in a way that the holder locking means 84, which preferably is arranged that in the locked position co-operate with similary holder locking means which are mentioned in the previous example or which can be hold in a suitable recess in the rack through a wallportion between two box holding spaces, being released from said holder locking means and the holder 80, after that by for example being influenced by springs and is pushed out from the rack, in a way that the holder 80 can be pulled out to the belonging "access position".

The invention is not restricted to the embodiment description above and illustrated in the drawings, but may be modified within the scope of the patent claims without departing from the idea of invention.

I claim:

1. Storage means for tape or disc recording media such as cassettes (2) for audio or video equipment or compact discs (3) of the CD/laser type, for example, each of which is so arranged as to be held in its own original protective box (4; 5) or a similar case which consists of lid and drawer elements (4A; 5A and 4B; 5B) capable of moving relative to each other, said box (4; 5) being so arranged as to be stored in a suitable holding space (10; 11) in a suitable storage rack (8; 9), said box either with or containing the recording medium being capable to slide into or from said space for the purpose of permitting the storage and the insertion or removal of a medium of the type in a closed "storage position" (I) or in an open "access position" (II), characterized in that a holder (6; 7), which is intended to be used to retaining said protective box (4; 5) in said desired positions (I;II) at said rack (8; 9), stored slidable between said two positions (I;II) in a storage space (10;11) in said storage rack (8; 9) and comprises a plate (14; 64; 81) which extends between the inner end (6A) and the outer end (6B) of the holder respectively, and which is slidable against and directed from the inner end of the space (10; 11) respectively, so that a protective box element (4A; 5B) can hold said holder (6; 7) with the plate (14; 64) extending along said box element (4A; 5B) between a number of clamping elements (12A; 92), which are located at the inner end (6A) of the plate (14; 64; 81) and which can co-operate with a section of a protective box element (4A; 5B) to a locking element (17), which is located at the outer end (6B) of the plate (14; 64; 81) and which co-operates with said protective box element (4A); and in that the holder (6; 7; 80) also includes means (22, 23; 94, 19; 84) capable of interacting with the storage rack (8; 9) so arranged as to prevent the holder and the protective box from being moved past said desired "access position" (II) and unauthorized movement from the "storage position" (I) of the holder.

2. Means in accordance with patent claim 1, characterized in the clamping elements (12A; 92) being resilient.

3. Means in accordance with claim 1 characterized in that the holder (6; 7; 80) exhibits control means (22, 23; 95) capable of interacting with suitable interacting control elements (24, 25) on the inside of the rack (8), for example to either side (15, 16) of the holder (6) situated in guide grooves extending in the direction of movement of the holder.

4. Means in accordance with patent claim 3, characterized in that said control means (22, 23) are so arranged in relation to the holder (6) that the majority of them are situated in an area bounded by the inner end (6A) of the holder and by a section of the edge (4C) of a box (4) enclosed in the holder (6).

5. Means in accordance with claim 3 characterized in that one end (24A, 25A) of said control element (24, 25) forms said stop means which is so arranged as to prevent the holder from being moved past said "access position" (II).

6. Means in accordance with any claim 1 in which a protective box (4; 5) is formed from a lid element (4A; 5A) capable of hinging relative to a drawer element (4B; 5B), one of said elements containing a perforated or solid edge section (4C; 67), which extends past the space in the box for holding a recording medium (2; 3) of the type in question, characterized in that a number of, for example, finger-like clamping elements (12A; 66; 92) which extend in a direction away from the inner end of the holder and towards its outer end are so arranged as to secure it to the same interacting part of the box by gripprng said edge section (4C; 67) of the box (4; 5) with an outer section of the holder, for example the lid plate (14) or the base plate (64) of the holder in a direction away from the inner end of the box and from the side of same.

7. Means in accordance with patent claim 6, characterized in that the outer end of each clamping element (12A; 92) exhibits a chamfered section (29; 30) intended to facilitate the introduction of a box (4) into its secured position in the holder (6; 80) and/or in order to facilitate the withdrawal of the holcer from its "storage position" (I) in the rack (8).

8. Means in accordance with claim 1 characterized in that the plate (14; 64) of the holder (6; 7; 80) which extends in a direction outwards from the rack (8; 9) and from the clamping elements (12A; 66) of the holder being so arranged as to lie in close contact along one section of the box (4A; 5B).

9. Means in accordance with claim 2 characterized in that that locking element (17) which is arranged to interact with said box element (4A) is situated on the plate (14) on its side (14A) facing the inner space (13) of the holder, for example in the form of a strip (17).

10. Means in accordance with claim 1 characterized in that on the side (14B) of the plate facing away from the internal space (13) of the holder the locking means (19) is arranged, preferably in the form of a locking projection (19), which is so arranged as to interact with a suitable locking element (20), preferably in the form of a locking recess (20) suitable to accommodate said locking projection (19).

11. Means in accordance with claim 1 characterized in that the holder (7) exhibits a lid erection means (71, 72), for example a lock (71) capable of being extended from the side (74) of the holder and capable of interacting with the side (73) of the lid (5A) and/or a flexible locking tongue (72), etc., capable of interacting with the inner edge (75) of the lid (5A), so arranged as to prevent the unintentional closing of the lid of the box.

12. Means in accordance with claim 2, characterized in that the holder exhibits control means capable of interacting with suitable interacting control elements on the inside of the rack, for example to either side of the holder situated in guide grooves extending in the direction of movement of the holder.

13. Means in accordance with claim 4, characterized in that one end of said control element forms said stop means which is so arranged as to prevent the holder from being moved past said "access position".

14. Means in accordance with claim 2, in which a protective box is formed from a lid element capable of hinging relative to a drawer element, one of said elements containing a perforated or solid edge section, which extends past the space in the box for holding a recording medium of the type in question, characterized in tha a number of, for example, finger-like clamping elements which extend in a direction away from the inner end of the holder and towards its outer end are so arranged as to secure it to the same interacting part of the box by gripping said edge section of the box with an outer section of the holder, for example the lid plate or the base plate of the holder in a direction away from the inner end of the box and from the side of same.

15. Means in accordance with claim 3, in which a protective box is formed from a lid element capable of hinging relative to a drawer element, one of said elements containing a perforated or solid edge section, which extends past the space in the box for holding a recording medium of the type in question, characterized in that a number of, for example, finger-like clamping elements which extend in a direction away from the inner end of the holder and towards its outer end are so arranged as to secure it to the same interacting part of the box by gripping said edge section of the box by gripping said edge section of the box with an outer section of the holder, for example the lid plate or the base plate of the holder in a direction away from the inner end of the box and from the side of same.

16. Means in accordance with claim 4, in which a protective box is formed from a lid element capable of hinging relative to a drawer element, one of said elements containing a perforated or solid edge section, which extends past the space in the box for holding a recording medium of the type in question, characterized in that a number of, for example, finger-like clamping elements which extend in a direction away from the inner end of the holder and towards its outer end are so arranged as to secure it to the same interacting part of the box by gripping said edge section of the box with an outer section of the holder, for example the lid plate or the base plate of the holder in a direction away from the inner end of the box and from the side of same.

17. Means in accordance with claim 5, in which a protective box is formed from a lid element capable of hinging relative to a drawer element, one of said elements containing a perforated or solid edge section, which extends past the space in the box for holding a recording medium of the type in question, characterized in that a number of, for example, finger-like clamping elements which extend in a direction away from the inner end of the holder and towards its outer end are so arranged as to secure it to the same interacting part of the box by gripping said edge section of the box with an outer section of the holder, for example the lid plate or the base plate of the holder in a direction away from the inner end of the box and from the side of same.

18. Means in accordance with claim 2, characterized in that the plate of the holder which extends in a direction outwards from the rack and from the clamping elements of the holder being so arranged as to lie in close contact along one section of the box.

19. Means in accordance with claim 3, characterized in that the plate of the holder which extends in a direction outwards from the rack and from the clamping elements of the holder being so arranged as to lie in close contact along one section of the box.

20. Means in accordance with claim 4, characterized in that the plate of the holder which extends in a direction outwards from the rack and from the clamping elements of the holder being so arranged as to lie in close contact along one section of the box.

* * * * *